United States Patent [19]

Kim et al.

[11] Patent Number: 5,290,890
[45] Date of Patent: Mar. 1, 1994

[54] PROCESS FOR MAKING PVC RESIN HAVING IMPROVED INITIAL COLOR AND CLARITY

[75] Inventors: Jongshun S. Kim, Avon Lake; Glenn A. Gall, Oberlin, both of Ohio

[73] Assignee: The Geon Company, Independence, Ohio

[21] Appl. No.: 995,722

[22] Filed: Dec. 23, 1992

[51] Int. Cl.$^5$ .............................................. C08F 2/16
[52] U.S. Cl. ................................. 526/225; 526/216; 526/234; 526/344.2
[58] Field of Search .............. 526/200, 225, 234, 216, 526/344.2

[56] References Cited

U.S. PATENT DOCUMENTS

| | | | |
|---|---|---|---|
| 3,413,277 | 11/1968 | Crano | 526/234 |
| 3,520,867 | 7/1970 | Lo Monaco | 526/234 |
| 4,668,707 | 5/1987 | Hawrylko | 526/344.2 |
| 4,711,908 | 12/1987 | Hawrylko | 526/202 |
| 4,957,983 | 9/1990 | Hawrylko | 526/200 |

*Primary Examiner*—Christopher Henderson
*Attorney, Agent, or Firm*—Miles B. Dearth

[57] ABSTRACT

This invention discloses methods of polymerization in the field of PVC dispersion resins, in particular, dispersion PVC, made by the emulsion or microsuspension process with or without monomer metering. The invention achieves improved initial plastisol color without destroying blush resistance by employing techniques which entail at least two air evacuation steps. In the preferred embodiment a specified amount of a metabisulfite reducing agent is incorporated into the polymerization medium and/or monomer mixture followed by polymerization initiaton and further processing. Another disclosure of the invention is a simple method for reducing the haze of dispersion resin plastisol films thereby improving their clarity by the addition of a small amount of non-copolymerizable polybasic carboxylic acid to the dispersion resin or monomer dispersion prior to isolating the resin. The preferred poly basic acids are non-ethylenic unsaturated, di7 or tri-carboxylic acids like citric acid and tartaric acid.

12 Claims, No Drawings

5,290,890

PROCESS FOR MAKING PVC RESIN HAVING IMPROVED INITIAL COLOR AND CLARITY

FIELD OF THE INVENTION

This invention pertains to methods of polymerization in the field of PVC resins, in particular, dispersion PVC made by the emulsion or microsuspension process. The art area encompasses plastisols derived from dispersion PVC, and articles formed using plastisols.

BACKGROUND OF THE INVENTION

PVC compounds are susceptible to discoloration absent proper stabilization. Also, while good stabilization features may be obtained by proper compounding, there still may be inherent deficiencies in the clarity, color and heat stability of the resin polymer which present limitations for commercial applications. With regard to dispersion PVC, these resins may be more specifically referred to as emulsion type or micro-suspension type dispersion PVC. These terms correspond to different methods of polymerization. Dispersion PVC is typically used in plastisol and organosol formulations, and there are limitations in inherent initial color after fusion, and color stability evidenced by premature yellowing of films either for unsupported films or film coatings on articles. Initial color is particularly noticeable when a clear film is applied to a light colored, opaque substrate like white flooring sheets. One important aspect not dependent on the resistance to discoloration after heat aging, is the initial color obtained only after sufficient heat for fusion. This color is also referred to the water-whiteness initially obtained. In addition to yellowing tendencies, in many applications, an article containing a plastisol coating can be susceptible to blushing on contact with water. Compounding formulation may limit to some extent the blushing of film or coatings, however it has been observed that the dispersion resin preparation method plays the most important part in determining the initial color and the blushing characteristics of the fused compound.

U.S. Pat. No. 4,076,920 discloses a method of preparing dispersion PVC which yields dispersion resins having improved heat stability, color and resistance to blushing on contact with water. These resins are made by polymerization using a colloidal dispersant system free of alkali metal soaps, and including the use of ammonium salt of a fatty acid and a long chain alcohol, with polymerization in basic medium which reduces polymer coagulum. The resins, when formulated into plastisols, fused into finished films, and subjected to elevated humidity showed improved blush resistance characterized by rapid recovery of film clarity. There are however limitations in the initial color of this type of resin when formulated as clear layers over white or light colored substrates.

Studies with other dispersion resins of the current state of the art, as clear plastisol films, still evidence some haze and coloration limitations. It would be desirable therefore to improve the initial color while also, preferably not sacrificing blush resistance in a dispersion PVC resin adaptable to plastisol applications. It would also be desirable to provide an effective method for improvement in clarity or haze of the articles derived from dispersion resins.

A method has been devised for manufacturing a dispersion PVC polymer which exhibits improved retention of water-white color, good resistance to blushing and improved clarity.

SUMMARY OF THE INVENTION

One object of the invention is to provide dispersion PVC resins with improved initial color and without destroying color blush resistance. The method of polymerization can be applied with emulsion polymerization and micro-suspension polymerization techniques which entail at least two air removal steps. In the preferred embodiment a specified amount of a metabisulfite salt reducing agent is incorporated into the polymerization medium and/or monomer mixture followed by polymerization initiator and further processing. The resin product when formulated into plastisols evidences improved initial color, without adversely affecting the resistance to blushing on contact with moisture.

It is another aspect of the invention to provide a simple method for reducing the haze of dispersion resin films thereby improving the clarity. The method entails the addition of a small amount of non-copolymerizable polybasic carboxylic acid to the resin or monomer dispersion. The preferred poly basic acids are di- or tri-carboxylic acids like citric acid and tartaric acid.

DETAILED DISCLOSURE OF THE INVENTION

This invention is directed to PVC dispersion resins useful in plastisols, organosols and the like. By virtue of the flowability of plastisol compounds, these can be processed into various useful products. For example, the plastisols can be used in making molded products, films, coatings, and the like. Accordingly, the vinyl dispersion resins mixed with the plasticizers to form liquid plastisols are capable of producing films, and like products, of good clarity, on fusing at elevated temperatures.

Dispersion PVC refers to particles of PVC polymer having a typical mean particle size diameter measured prior to drying of from 0.05 microns to about 10 microns, preferably the average diameter ranges from about 0.5 to about 3 microns.

In general, the preparation of dispersion PVC is effected by the emulsion or micro-suspension polymerization processes, where the latex obtained contains colloidally stable particles prior to removal of water. The use of various different emulsifiers and catalysts are known. Also, varying the conditions of polymerization has been suggested. The preferred method for preparing the dispersion PVC herein using emulsion process is referred to as a low soap recipe and is made in a batchwise process. The preferred method for making dispersion PVC using the microsuspension method is the pre-mix monomer method. The methods of the present invention are also applicable to monomer metering methods which are known in the art. For the sake of brevity, a batch-wise, low soap, emulsion polymerization method and a micro suspension method using a pre-mix recipe will be described in sufficient detail so as to provide a method of practicing the invention.

When preparing dispersion vinyl homopolymers or copolymers by means of an emulsion or micro suspension polymerization technique, an aqueous medium is employed. When using these polymerization procedures, the aqueous reaction medium will contain one or more emulsifiers, or an emulsifier system. Anionic emulsifiers, such as the alkali metal or ammonium sulfonate or sulfate salts having from 8 to 18 carbon atoms can be used. Examples of such emulsifiers are sodium sulfate, ethanolamine lauryl sulfate, ethylamine lauryl sulfate, and the like; alkali metal and ammonium salts of sulfonated petroleum and paraffin oils; sodium salts of hydrocarbon sulfonic acids, such as dodecane-1-sulfonic acid and octadiene-1-sulfonic acid; sodium salts of alpha-olefin sulfonates, aralkyl sulfonates, such as sodium isopropyl benzene sulfonate, sodium dodecyl benzene sulfonate, sodium isobutyl naphthalene sulfonate, and the like; alkali metal and ammonium salts of sulfonate, and the like; alkali metal and ammonium salts of sulfonate dicarboxylic acid esters, such as sodium dioctyl sulfosuccinate, disodium-n-octadecyl sulfosuccinate, and the like; alkali metal and ammonium salts of the free acid of complex organic mono- and di-phosphate esters and the like. Nonionic emulsifiers, such as octyl- or nonylphenyl polyethoxyethanol, may also be used. Dispersion vinyl copolymer lattices having an excellent colloidal stability are obtained when using the alkali metal and ammonium salts of long chain sulfonates.

Fatty acid derivatives can be used as an emulsifier. Preferable versions are ammonium salts of long chain saturated fatty acids. Significant amounts of alkali metal salts of the fatty acids are preferably avoided. The fatty acids useful herein may be either natural or synthetic and preferably contain from 8 to 30 carbon atoms, more preferably 8 to 20 carbons. As examples of such acids there may be named lauric, myristic, palmitic, margaric, stearic, and the like. The sources of these include beef tallow, coconut oil, and the like including mixtures. Commercial sources are listed in Chemical Week Buyers Guide. The emulsifier is generally employed in an amount in the range of about 0.5% to about 4.0% by weight based on the total weight of the monomer or monomers being introduced for polymerizing. It is also possible to use mixtures of ammonium salts of the fatty acids in the emulsifier system.

The ammonium salt can be made beforehand by mixing the fatty acid and ammonium hydroxide. However, it can be prepared in situ, that is, an unneutralized fatty acid and ammonium hydroxide are added to the polymerization medium wherein they form the water soluble salt. It is preferred to use an excess molar amount of ammonium hydroxide over the amount of fatty acid employed.

In addition to the ammonium salt of a long chain fatty acid, a nonionic emulsifier is preferred. These include long chain saturated alcohols containing 8 to 30 carbons, preferably from 12 to 24 carbon atoms. Examples of such preferred alcohols are dodecanol, tridecanol, tetradecanol, pentadecanol, hexadecanol, heptadecanol, octadecanol, nonadecanol, eicosanol, heneicosanol, docosanol, tricosanol, and tetracosanol. Mixtures of alcohol and another nonionic sufactant can also be employed, for example, a 14 carbon alcohol and an 18 carbon alcohol.

The polymerization reaction is preferably carried out in basic medium, that is in a pH range of from about 7.0 to about 12.0. It is more preferred to polymerize at a pH range of about 8.0 to about 10.5. If the pH is too low, for example below 7.0, then more base is needed. The amount of base, for example, $NH_4OH$ needed to properly adjust the pH will depend in part on the particular emulsifier system being used in the reaction mixture.

Free radical yielding initiators, normally used for polymerizing olefinically unsaturated monomers, are satisfactory for use herein. Alkali metal, initiators such as containing sodium and potassium, and the like are preferably avoided. The useful initiators include, for example, the various peroxygen compounds, such as lauryl peroxide, isopropyl peroxydicarbonate, benzoyl peroxide, t-butyl hydroperoxide, t-butyl peroxypivalate, cumene hydroperoxide, t-butyl diperphthalate, pelargonyl peroxide, 1-hydroxycyclohexyl hydroperoxide, and the like; azo compounds, such as azodiisobutyronitrile, dimethylazodiisobutyrate, and the like. Other exemplary initiators are the water-soluble peroxygen compounds, such as hydrogen peroxide, persulfates, such as potassium persulfate, ammonium persulfate, and the like. The amount of initiator used will generally be in the range between about 0.01% to about 0.5% by weight, based on the weight of 100 parts of monomer or monomers being polymerized, and preferably between about 0.02% and about 0.1% by weight. The most preferred initiators for emulsion polymerization are ammonium peroxygen compounds. For microsuspension polymerization, in general, any monomer soluble initiator may be used such as the percarbonates and peroxyesters.

The general method for a batch-wise process is distinguished from the premix method discussed below. Initiators may be charged completely at the outset of a batch-wise polymerization. In a premixed monomer recipe, initiator may be added to the monomer premix with the other ingredients of the reaction mixture. This is particularly true if the premix is homogenized prior to introduction into the reactor, and is preferred. Upon introduction of the homogenized mixture into the polymerization reactor (poly), the temperature is then raised to that at which initiation will take place.

Prior to initiation, the present invention involves a combination of steps to be taken in order to provide the aforementioned improvements in film color. The first step involves removal of substantially all of the air in the pre-mix or polymerization vessel at least twice followed by a introduction into the vessel(s) of an inert gas such as nitrogen. The preferred method of air removal is by evacuation means. This is referred to as gas inerting. In the present method of the invention it was found that performing the evacuation at least twice, and gas inerting at least once before polymerization, resulted in substantial improvement in film color. In practice, when evacuation is conducted only once, the result is poorer film color. Under somewhat less extensive evacuation, there can be three or four successive evacuations prior to initiation which will result in notable color improvements.

Evacuation followed by introduction of monomer instead of gas is referred to as monomer inerting. It was found in one small scale experiment that after four gas inerting steps, followed by monomer inerting, and the introduction of a reducing agent, prior to initiation, substantial improvements in initial plastisol color resulted. Also, when the resin was used in a plastisol and fused, the film exhibited desirable low blushing characteristics in a high humidity environment. Thus, a distinct color advantage was obtained while the amount of reducing agent additive used was not destructive of the water blushing performance. If substantially more reducing agent is employed, film color noticeably worsens.

Measurement of oxygen levels from the head space of the polymerizer is helpful. The level of oxygen in the head space of the polymerizer found to exceed about 350 ppm results in undesirable film color. Preferably, oxygen levels should be below about 250 ppm in the head space. These measurements can be made with the use of an electrochemical fuel cell type or para-magnetic types which are commercially available. An in-line sampling device may be installed, for example, in a vent line.

It is a general practice to initially check for air leaks in all pressure vessels and handling lines. This is routinely achieved when maximum vacuum is applied and the vessel and/or lines are closed for a time sufficient for monitoring any rise in pressure. At altitudes near sea level, for all practical purposes, it is sufficient to evacuate a vessel to at least about 26 inches of mercury in any evacuation step, preferably 27 inches of mercury (Hg), and most preferably at least about 28 inches Hg.

The temperature of reaction in the instant polymerization process is considered since the molecular weight hence, intrinsic viscosity (I.V.) of PVC is a direct function of the temperature of reaction. Accordingly, the end use considerations for the resin to be produced will normally dictate the reaction temperature. For example, when producing dispersion resins to be used in coatings or casting flexible films, a relatively lower temperature may be suggested in order to attain a relatively higher I.V. resin desirable for coating applications. Generally, dispersion resins are polymerized at temperatures in the range of about 30° C. to about 70° C. It is preferred, however, to employ a temperature of polymerization in the range of about 40° C. to about 60° C.

In another preferred embodiment, a small amount of polybasic carboxylic acid or its derivative is added to the aqueous dispersion, preferably after polymerization has proceeded substantially to completion. It is preferred to neutralize this acid prior to introducing into the polymerization. Preferred polybasic acids are the saturated di-, tri-, or tetra- carboxylic acids. The polybasic carboxylic acids are not polymeric and preferably are not ethylenically unsaturated. Aminocarboxylic acids are preferably avoided and do not achieve effective improvements in clarity and haze by this method. The polybasic carboxylic acids which are most preferred include tartaric acid and citric acid. Citric acid derivatives include, for example, acetonedicarboxylic acid, citraconic acid, mesaconic acid, aconitic acid, methylsuccinic acid, and oxalic acid. Generally, the amount of polybasic acid which can be used ranges from about 0.01 to about 1.0 weight parts, more preferably 0.05 to 0.5 weight parts and most preferably 0.08 to 0.2 weight parts per 100 parts of monomer (phm) charged, that is the amount of monomer initially employed before monomer conversion to resin.

Upon completion of the polymerization reaction, the dispersion resin is typically isolated in powder form from the latex by means of spray drying or other methods such as coagulation and fluid energy mill drying. Spray drying involves producing a fine spray of the polymer latex which is injected into a heated air chamber thereby removing the water and recovering the dried resin in powder form.

Plastisols are typically made with the dispersion resins of the present invention by uniformly blending or intimately mixing, by conventional mixing or blending means, with for example, 100 parts by weight of the dispersion resin in powder form, from about 30 to about 100 parts by weight of one or more plasticizers and any stabilizer and other optional ingredients. Exemplary plasticizers are the alkyl and alkoxy alkyl esters of dicarboxylic acids or the esters of a polyhydric alcohol and monobasic acid. As examples of such materials are dibutyl phthalate, dioctyl phthalate, diethylhexyl phthalate, dibutyl sebacate, dinonyl phthalate, di(2-ethyl hexyl)phthalate, di(2-ethyl hexyl)adipate, dilauryl phthalate, dimethyl tetrachlorophthalate, butyl phthalyl butyl glycollate, glyceryl stearate, and the like.

EMULSION RESIN EXAMPLES

The invention was carried out with an emulsion batchwise process to prepare the dispersion resins. The following recipe was used:

|  | weight parts |
| --- | --- |
| Vinyl chloride | 100 |
| Water | 163 |
| Amm. persulfate | 0.04 |
| Amm. hydroxide | 0.03 |
| Hydrogen peroxide | 0.0008 |
| Seed latex (32% solids)** | 16 |
| Amm. laurate* | 0.8 |
| $CuSO_4$ | 0.0003 |

** 0.5μ average particle size PVC
*proportioned

The reactor was evacuated 3 times and broken with $N_2$. Preceding the charging of water into the polymerizer, nitrogen was bubbled through the water for about 15 minutes. Seed latex, which is a polyvinyl chloride emulsion polymer having an average particle diameter of about 0.5 microns, water and $CuSO_4$ are drawn into the reactor. It is advisable to pull a vacuum again on the poly, recording the pressure, waiting about 15 minutes and noting the pressure to check for any leaks. In this instance vacuum was pulled to 28 inches Hg for leak testing, then the vacuum was broken to 0 psig with nitrogen. Maximum vacuum in this instance, under the prevailing ambient atmospheric pressure, using the particular equipment was about 28 inches Hg. A second evacuation was drawn again. At this time agitation was started and vinyl chloride monomer charged to the poly. The poly was heated and when the reactor contents reached approximately 42° C., initiator solution of ammonium persulfate and ammonium hydroxide in 0.5 lb. water was introduced. When the contents reached 45° C., hydrogen peroxide in 0.5 lb. water was added. Surfactant solution was proportioned into the reactor at a rate of 450 cc/hour. The proportioning was completed after the third hour of polymerization. The reaction was allowed to proceed until pressure dropped 15 psig. The reactor was heated to 80° C. while venting. The dispersion was filtered through a muslin sock and spray dried.

This resin, when formulated into a plastisol and drawn into a film on a standard substrate followed by fusing, gave a color rating of 3 compared to the control resin which had a color rating of 5. Under this rating system a rating of 1 is the best and 5 is the worst. The color rating is a qualitative visual comparison between the film exhibiting the best water-whiteness and one made by introducing a substantial amount of air prior to polymerization.

It is preferred to pre-treat the water and sope solution before proportioning by evacuation, bubbling nitrogen and keeping any pre-mixed components under a nitrogen blanket until used. It is also preferred to store the components under a positive nitrogen pressure. There are a variety of alternative mechanical means for pre-treating water which may be employed, such as by the use of deaerators, or by commercial chemical treatments.

In another preferred embodiment, a small amount of ammonia neutralized tartaric or citric acid is added to the aqueous dispersion resin prior to spray drying. Generally, the amount which can be used ranges from 0.01 to 1.0 phr, more preferably 0.05 to 0.5 phr, and most preferably 0.08 to 0.2 phr on a weight solids basis. The surprising effect was a substantial reduction in film haze and improved clarity.

DISPERSION PASTE RESINS

The pre-mixed monomer polymerization procedure for preparing microsuspension resins referred to as paste resins will be described. The microsuspension process differs substantially from the emulsion process. Instead of a water soluble initiator which provides an aqueous phase polymerization in the emulsion process, an oil soluble initiator system is used in micro-suspension processes which provides a monomer phase polymerization site. The ultimate plastisol properties of dispersion resins are different between these two subclasses of dispersion resin primarily in the differences of rheology exhibited, and foamability characteristics, which are beyond the scope of the invention.

Dispersion paste PVC resins having the aforementioned improvements can be made using the semi-batch process, also referred to as the premix monomer method. In the premix method the polymerization components are charged initially to a premix vessel followed by homogenization and transfer to the polymerization vessel for heating to initiate the reaction. In contrast to the emulsion process which employs a water soluble initiator, the paste resin process is a microsuspension method using oil soluble initiators. Suitable oil soluble initiators are peroxyesters and peroxydicarbonates.

In the practice of the invention applied in preparing paste resins, the polymerizer and the pre-mix vessel are evacuated and broken with nitrogen at least twice. Any vessel used for holding ingredients such as surfactant solutions are advantageously kept under a nitrogen blanket. It is also preferable to bubble nitrogen through any water prior to use. In the most preferred method, the reactor is evacuated three times and broken with inert gas, followed by evacuation twice, broken with vinyl chloride monomer to a pressure of about 5-10 psig. Generally, it is desirable to assess the level of oxygen in the monomer used. The concentration of oxygen the head space over any monomer, for example vinyl chloride monomer, contained in a vessel should be kept below about 250 ppm. Venting of the monomer head space as well as other methods previously mentioned can be effected to reduce the oxygen level. Vinyl chloride monomer handling systems in practice are designed for closed loop recycling, thus, where monomer venting is undertaken, it is presumed to be venting to the closed recovery system.

The preferred microsuspension pre-mixed monomer method described herein includes the steps of combining water, monomer(s) and surfactant in a pre-mix vessel followed by homogenization, transfer to the poly and initiation of polymerization. A preferred water insoluble $C_8$-$C_{24}$ nonionic surfactant, is combined with a long chain carboxylic acid ammonium salt as the surfactant system. More preferred are $C_8$ to $C_{20}$ nonionic surfactants, and most preferred are $C_{10}$ to $C_{18}$ nonionic surfactants. The nonionic surfactant is first emulsified in hot water which contains a portion of the total long chain carboxylic acid salt surfactant to be used. This emulsion of nonionic surfactant is then combined with the other ingredients in the premix and the pre-mix is then homogenized.

During the preparation of the pre-mix, the contents of the pre-mix vessel should be kept under a nitrogen or vinyl chloride blanket until transferred. Water is first charged to the pre-mix vessel. Nitrogen is bubbled for at least about 15 minutes. In addition, evacuation is preferably commenced during the charging of water. A quantitative amount of prepared surfactant emulsion is charged to the premix vessel, and agitation is commenced. Initiator, vinyl chloride monomer and reducing agent are charged to the pre-mix vessel. The premix is homogenized by recirculating through a homogenizer for a time sufficient to provide a uniform, fine dispersion of monomer in water. A suitable commercially available rotor-stator homogenizer can be used. A variety of other homogenizer types may also be used. After homogenization, the pre-mixture is transferred to the poly which has been evacuated at least twice followed by breaking with inert gas, and optionally evacuated followed by breaking the vacuum with monomer. The poly is then heated to the desired initiation temperature wherein polymerization commences. Upon completion of the polymerization reaction, as noted typically by a pressure drop, the dispersion resin is preferably treated with an effective amount of polybasic carboxylic acid, followed by isolation of the resin in powder form from the aqueous dispersion by means of spray drying.

PASTE RESIN EXAMPLES 1-5

Dispersion paste resins were prepared using the premix paste method and visual comparisons were made between the initial color of cast clear films coated on black/white standard plaques, with those resins made without following the method of the invention.

The polymerization ingredients are listed in table A. All parts are expressed as weight parts per 100 weight parts of monomer (phm). In these examples, homopolymers were made, thus parts are expressed as parts per 100 parts vinyl chloride monomer. In example 1, resin was prepared by charging water, ammonium hydroxide, and ammonium laurate to the pre-mix vessel. The nonionic surfactant was emulsified with 0.2 phm of the ammonium laurate in 25 phm of water. This emulsion along with plasticizer was added to the premix vessel under agitation. The initiator and 0.007 parts of the BHT were then added. The premix vessel was evacuated 3 times followed each time with breaks using nitrogen. Vinyl chloride was charged and the mixture was further agitated. The premix was homogenized and then transferred through inerted lines to the polymerizer which had been evacuated 2 times followed each time with nitrogen breaks. The polymerization ingredients were heated to the initiation temperature, which in this case was 45° C. The reaction was allowed to proceed 14 hours or until the pressure dropped 15 psig. At this time the remainder of the BHT was added. The poly was then vented while heating to 70° C. for 2 hours. The dispersion was cooled and spray dried.

TABLE A

| component | 1 | 2 | 3 | 4 | 5 |
|---|---|---|---|---|---|
| Vinyl Chloride | 100 | 100 | 100 | 100 | 100 |

TABLE A-continued

| component | 1 | 2 | 3 | 4 | 5 |
|---|---|---|---|---|---|
| Water | 175 | 175 | 175 | 175 | 175 |
| Ammonium Laurate | 1.63 | 1.63 | 1.63 | 1.63 | 1.63 |
| Ammonium Hydroxide | 0.01 | 0.01 | 0.01 | 0.01 | 0.01 |
| Nonionic Surfactant | 0.4 | 0.4 | 0.4 | 0.4 | 0.4 |
| Plasticizer | 0.25 | 0.25 | 0.25 | 0.25 | 0.25 |
| BHT | 0.207 | 0.207 | 0.207 | 0.207 | 0.207 |
| Organic Peroxide Initiator | 0.068 | 0.068 | 0.068 | 0.04 | 0.04 |
| Sodium Metabisulfite | 0 | 0 | 0 | 0.03 | 0.02 |

By the method described above, the control example 1 was made wherein prior to commencing initiation of polymerization, a vacuum was twice drawn to about 28 inches of mercury and broken each with nitrogen. There was no monomer inerting step. The color rating of the cast film plaques was 2 on a scale of 1 to 5, wherein 5 was the worst and 1 was the best color rating.

Control example 2 comprised a film made from a dispersion resin prepared in the same manner as example 1 except after the second poly evacuation, oxygen was bled into the reactor to a pressure rise of 2.0 inches of mercury. The color rating of the film plaques was 5 which is the worst rating.

Control example 3 was prepared as in example 1 except four successive evacuations followed by nitrogen breaks were performed on both the poly and the premix vessel. The color rating of film plaques using this resin was 2.

Inventive example 4 illustrates the effect of 4 vacuum cycles, however in the last 2 cycles in both the premix vessel and polymerizer, the vacuum was broken by bleeding vinyl chloride instead of nitrogen, and 0.03 parts of sodium metabisulfite was added after the evacuation steps in the premix. The initial color was 1.

Inventive example 5 was prepared as in example 4, except that 0.02 parts of reducing agent was introduced. The initial color rating was 1.

In the preparation of the dispersion resins used in the above examples 4 and 5, the amount of reducing agent employed was effective in improving color but not in an amount which interfered with initiation, nor the rate of polymerization to any appreciable extent. While the effective amount of the reducing agent did have a positive effect on initial color, the effective amount did not cause an increase in blushing on contact with water. Suitable reducing agents are metal salts of metabisulfite such as sodium metabisulfite.

IMPROVED CLARITY AND HAZE

The following examples illustrate the effect of the addition of a small amount of polybasic acid to the dispersion resin before drying. The following examples employed plastisol films made with dispersion resin following the above microsuspension method but with post-added neutralized polybasic carboxylic acid prior to drying. The control film was made with a resin which did not contain any post-added polybasic acid.

| | EXAMPLE | | |
|---|---|---|---|
| | 6 | 7 | 8 |
| Tartaric Acid | 0 | 0.1 phr | — |
| Citric Acid | 0 | — | 0.1 phr |
| Viscosity, cp | | | |
| 1 Day V2* | 2050 | 2500 | 2100 |
| 1 Day V20* | 1895 | 2420 | 1840 |
| Severs Effulux (1 Day, 95 psi) | 26.7 | 25.8 | 22.5 |
| Initial Color (1 = best, 5 = worst) | 1 | 1 | 1 |
| Clarity % (% Transmission) | 28.1 | 77.1 | 87.1 |
| Haze, % | 65.0 | 17.1 | 8.3 |

*Brookfield viscosity at 2 and 20 rpm after 1 day aging.

As is seen from the table above there is a significant effect on the resulting plastisol film clarity and percent haze upon the addition of an effective amount of polybasic acid, in this case either tartaric acid or citric acid.

While the present invention has been described in terms of its specific embodiments, certain modifications and equivalents will be apparent to those skilled in the art and are intended to be included within the scope of the present invention, which is to be limited only by the reasonable scope of the appended claims.

We claim:

1. An aqueous process for preparing a dispersion PVC resin having a mean particle size diameter of from 0.05 microns to about 10 microns at from 30° to 70° C. using the micro-suspension process, consisting essentially of the independent steps of:
   (a) adding to a pressure vessel at least one of the group consisting of water, monomer, and surfactant comprising ammonium sulfate or ammonium sulfonate salts having from 8 to 18 carbons.
   (b) removal of substantially all of the air within said vessel and thereafter introducing an inert gas,
   (c) removal of substantially all of the air within said vessel after said inert gas is introduced,
   (d) adding from 0.01 to 0.5 weight parts per 100 weight parts of monomer of a metabisulfite reducing agent,
   (e) adding at least one oil soluble initiator,
   (f) commencing polymerization, and
   (g) recovering said resin.

2. The process of claim 1 wherein step (b) is repeated at least once.

3. The process of claim 2 wherein removal of said air is by evacuation means and is effected to at least 26 inches Hg.

4. The process of claim 3 wherein vacuum is effected to at least 27 inches Hg.

5. The process of claim 1 which is a batch-wise process.

6. The process of claim 1 which is a semi-batch-wise process.

7. The process of claim 1 wherein said reducing agent is sodium metabisulfite.

8. An aqueous process for preparing a dispersion PVC resin having a mean particle size diameter of from 0.05 microns to about 10 microns at from 30° C. to 70° C. resin using the monomer metering method, consisting essentially of the independent steps of:
   (a) adding to a vessel at least one of the group consisting of water, monomer, and surfactant comprising ammonium sulfate or ammonium sulfonate salts having from 8 to 18 carbons.

(b) removal substantially all of the air in said vessel, and thereafter introducing an inert gas,
(c) repeating step (b) at least once,
(d) optionally adding from 0.01 to 0.5 weight parts per 100 weight parts of monomer of a metabisulfite reducing agent,
(e) adding at least one initiator,
(f) commencing polymerization and metering monomer into said vessel, and
(g) recovering said resin.

9. The process of claim 8 wherein step (b) is repeated once.

10. The process of claim 8 wherein said removal is by evacuation means and is effected to at least 26 inches Hg.

11. The process of claim 10 wherein said vacuum is effected to at least 27 inches Hg.

12. The process of claim 8 wherein said reducing agent is sodium metabisulfite.

* * * * *